(12) United States Patent
Masters

(10) Patent No.: US 10,436,091 B2
(45) Date of Patent: Oct. 8, 2019

(54) EMISSION CONTROL DEVICE

(71) Applicant: POLLUTION CONTROL DEVICES, LLC, Mint Hill, NC (US)

(72) Inventor: Ben F. Masters, Charlotte, NC (US)

(73) Assignee: POLLUTION CONTROL DEVICES, LLC, Mint Hill, NC (US)

( * ) Notice: Subject to any disclaimer, the term of this patent is extended or adjusted under 35 U.S.C. 154(b) by 15 days.

(21) Appl. No.: 15/612,828

(22) Filed: Jun. 2, 2017

(65) Prior Publication Data

US 2017/0350289 A1 Dec. 7, 2017

Related U.S. Application Data

(60) Provisional application No. 62/344,599, filed on Jun. 2, 2016.

(51) Int. Cl.
| | | |
|---|---|---|
| *F01N 3/08* | (2006.01) | |
| *B01D 53/32* | (2006.01) | |
| *B01D 53/94* | (2006.01) | |

(52) U.S. Cl.
CPC ........... *F01N 3/0892* (2013.01); *B01D 53/32* (2013.01); *B01D 53/9459* (2013.01); *B01D 2255/2027* (2013.01); *B01D 2255/2045* (2013.01); *B01D 2255/2047* (2013.01); *B01D 2255/2092* (2013.01); *B01D 2255/20738* (2013.01); *B01D 2255/30* (2013.01); *B01D 2259/818* (2013.01)

(58) Field of Classification Search
CPC ................ B01D 53/32; B01D 53/9459; B01D 2255/2027; B01D 2255/2045; B01D 2255/2047; B01D 2255/20738; B01D 2255/2092; B01D 2255/30; B01D 2259/818; F01N 3/0892

See application file for complete search history.

(56) References Cited

U.S. PATENT DOCUMENTS

| | | | | |
|---|---|---|---|---|
| 5,419,123 | A | * 5/1995 | Masters | .................. B01D 53/32 422/171 |
| 5,711,147 | A | 1/1998 | Vogtlin et al. | |
| 6,101,714 | A | * 8/2000 | Schmitt | .............. B01D 53/9454 29/463 |
| 6,432,280 | B1 | 8/2002 | Bianco et al. | |
| 6,508,991 | B2 | 1/2003 | Keppel | |
| 6,557,340 | B1 | * 5/2003 | Twigg | .................... B01D 53/32 60/274 |
| 6,887,438 | B2 | 5/2005 | Labarge et al. | |
| 7,534,401 | B2 | 5/2009 | Keppel et al. | |

(Continued)

FOREIGN PATENT DOCUMENTS

WO 2004011783 A2 2/2004

*Primary Examiner* — Brandon D Lee

(74) *Attorney, Agent, or Firm* — Thomas E. Lees, LLC

(57) ABSTRACT

An apparatus for reducing toxic gases from exhaust of a vehicle comprises a shell disposed in line with an exhaust path of a vehicle and an electrode that passes through the shell. Further, the apparatus comprises a power control system programmed to supply at least 120 kV to the electrode at a predefined pulse rate, which creates an arc of electricity forms between the electrode and a first screen. A substrate coated with an oxidizer is disposed within the shell downstream from the first screen. Further, a second screen is disposed within the shell downstream from the substrate such that the substrate is disposed between the first screen and the second screen.

20 Claims, 4 Drawing Sheets

(56) References Cited

U.S. PATENT DOCUMENTS

2003/0146310 A1* 8/2003 Jackson .................. A62D 3/19
239/690
2004/0079631 A1 4/2004 Birckigt et al.

* cited by examiner

EMISSION CONTROL DEVICE

BACKGROUND

Various aspects of the present invention relate generally to exhaust systems and specifically to reducing toxic gas emissions from an exhaust flow.

Emissions of typical consumer gasoline (or diesel) powered vehicles include nitrogen, carbon dioxide, water vapor, and oxygen (in some cases), along with traces of nitrogen oxides, carbon monoxide, sulfur dioxide, and hydrocarbons. Some of those emissions (e.g., nitrogen oxides, carbon monoxide, sulfur dioxide, and hydrocarbons) are toxic. To reduce the toxic gases, catalytic converters are added to an exhaust path of automobiles. Typical catalytic converters combine oxygen with carbon monoxide and unburned hydrocarbons to create carbon dioxide and water. Other catalytic converters further reduce nitrogen oxides as well as reducing unburned hydrocarbons and carbon monoxide.

These catalytic converters require a warm up period to function properly. As such, during the first few minutes after activation, the most toxic gases are expelled. Therefore, some vehicles include a smaller pre-catalytic converter that heats up much quicker to reduce toxins during the startup phase of the regular catalytic converter.

BRIEF SUMMARY

According to aspects of the present invention, an apparatus for reducing toxic gases from exhaust of a vehicle comprises a shell disposed in line with an exhaust path of a vehicle and an electrode that passes through the shell. Further, the apparatus comprises a power control system programmed to supply at least 120 kV to the electrode at a predefined pulse rate, which creates an arc of electricity forms between the electrode and a first screen. A substrate coated with an oxidizer is disposed within the shell downstream from the first screen. Further, a second screen is disposed within the shell downstream from the substrate such that the substrate is disposed between the first screen and the second screen.

DETAILED DESCRIPTION

According to aspects of the present disclosure, an emissions control device processes exhaust gases to remove toxins. Basically, a shell with two screens and a substrate disposed between the two screens is disposed within an exhaust path of a vehicle. An electrode coupled to a control system and disposed near one of the screens pulses a voltage at a rate and voltage dependent on a firing rate of the engine of the vehicle. When the electrode pulses, a current arcs from the electrode to the screens to process the exhaust gases. For example, the arc will break down the toxic gases into finer molecules, which pass through the substrate to lower the toxic gases in the exhaust stream dramatically. Further, the electrode also produces an arc to the second screen, which creates plasma to remove more toxins.

Figure 1:
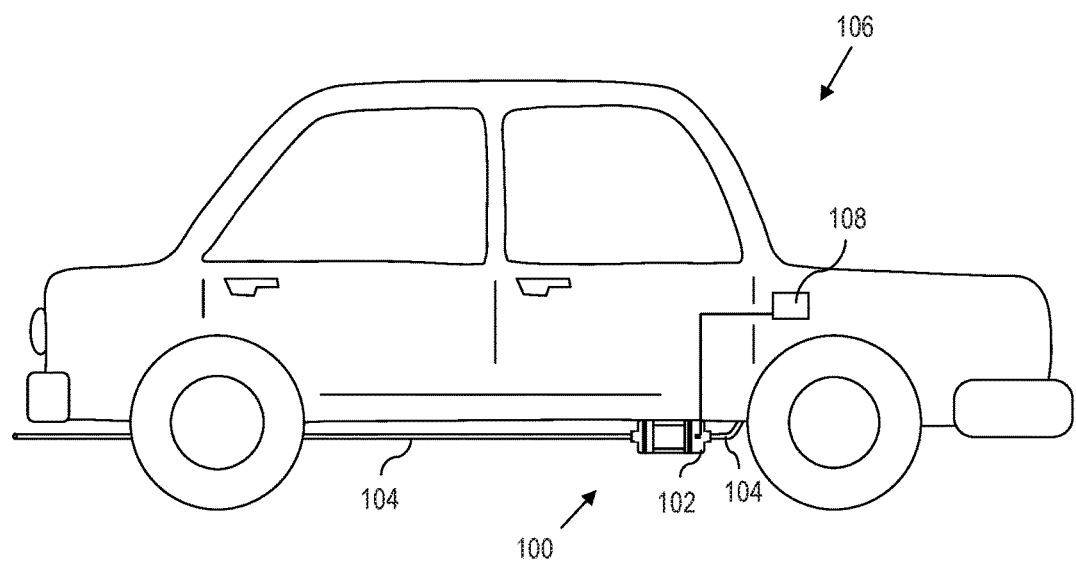
FIG. 1 illustrates an apparatus for reducing toxic gases in an exhaust stream coupled to an exhaust system of a vehicle, according to various aspects of the present disclosure.

Referring now to FIG. 1, a device 100 for reducing toxic emissions is shown. Specifically, a shell 102 of the device 100 is placed in line with an exhaust path 104 of a vehicle 106. Thus, when gases from an engine of the vehicle 106 flow through the exhaust path 104, they will flow through the shell 102, which includes several ways of reducing toxins, as discussed in greater detail below. As shown, the shell 102 is near a front of the exhaust path 104. However, the shell 102 may be placed anywhere (e.g., front, middle, end, etc.) along the exhaust path 104, including in line with the passenger or driver seats, which are usually over fifty centimeters from a manifold of the vehicle.

Further, the device 100 includes a power control system 108 that communicates with components of the shell 102 to reduce the toxins in the exhaust path, as explained in greater detail below. For example, a microprocessor of the power control system 108 may receive information about the engine and supply a high-voltage pulse to the shell 102 to aid in removing the toxins.

Figure 2:
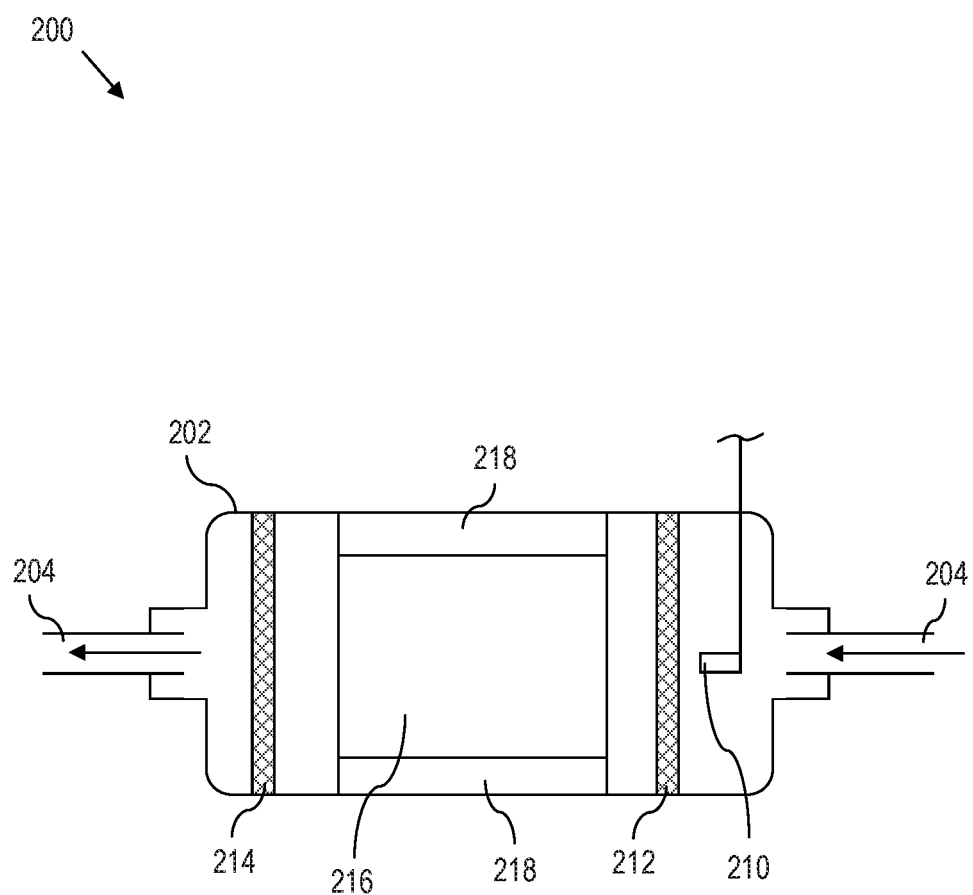
FIG. 2 illustrates a flow portion of the apparatus for reducing toxic gases including a shell, two screens and a substrate, according to various aspects of the present disclosure.

Turning now to FIG. 2, the shell 202 of the device 200 is shown in greater detail. An electrode 210 passes through the shell 202 from the power control system (discussed in greater detail with reference to FIG. 3). Further, the device 200 includes a first screen 212 disposed within the shell 202 apart from the electrode 210, a second screen 214 disposed within the shell 202 downstream from the first screen 212, and a substrate 216 disposed between the first screen 212 and the second screen 214. As shown in FIG. 2, the electrode 210 is placed before the first screen 212 and the substrate 216.

As stated above, the shell 202 is placed in an exhaust path of a toxic gas generator (e.g., an engine of a vehicle). Thus, when exhaust gases leaves the generator, the gases must pass through the shell 202, which will clean several toxins from the exhaust gases.

In several embodiments of the device 200, the electrode 210 pulses between 1,500 and 15,000 pulses per minute at 40 kV (kilovolts), which is high enough to produce an arc of current from the electrode 210 to the first screen 212. When toxic gases pass between the electrode 210 and the first screen 212, several toxic gases are converted to less toxic gases. For example, a typical exhaust flow from a vehicle engine includes nitrogen, carbon dioxide, water vapor, total hydrocarbon (THC), and oxygen (in some cases), along with traces of nitrogen oxides, carbon monoxide, and sulfur dioxide. When the exhaust flow passes through the current, the gases are broken down into fine molecules. The shell 202 is fully grounded to the vehicle, so there is no danger to outside persons or materials.

In other embodiments, the electrode pulses between 12,000 and 15,000 pulses per minute at 120 kV, which produces a stronger current than described above. When the exhaust flow passes through the current, the gases are broken down into fine molecules.

Further, the composition of the first screen 212 may include materials that will react with the exhaust flow. For example, the first screen 212 may comprise copper, stainless steel, nickel, or a combination thereof. In some embodiments, the first screen 212 is a composite of copper and stainless steel, which reduces an amount of nitrogen oxides in the exhaust flow. Further, the screen may be made of a material that will not react with the exhaust flow.

The substrate 216 is coated with an oxidizer that reacts with the broken down gases to eliminate many of the broken down toxic gases. For example, the substrate 216 may include silica, sodium oxide, alumina, magnesia, calcium oxide, and iron oxide. When the exhaust flow passes through the substrate 216, the arc of electricity may create ozone in the exhaust flow, and the oxidizers may remove an oxygen atom from the ozone and attach it to a carbon monoxide molecule to create a carbon dioxide molecule (which is less toxic than a carbon monoxide molecule). Other reactions may occur on the exhaust gases within the substrate, which will remove more toxic cases. For example, the substrate 216 acts as a catalyst by breaking up and redistributing molecules among other molecules in the exhaust.

To ensure that the exhaust flow goes through the substrate 216 and to reduce wear and tear on the substrate 26, a blanket 218 is disposed between the substrate 216 and the shell 202 to create a seal between the substrate 216 and the shell 202 that compensates for thermal expansion and contraction of the shell 202. Thus, exhaust gases will pass through the substrate (making contact with the oxidizers) regardless of the temperature of the shell 202.

After the substrate 216, the exhaust gases flow to the second screen 214. As with the first screen 212, the second screen 214 may be comprised of any desired material. For example, second screen 214 may comprise copper, stainless steel, nickel, or a combination thereof. In some embodiments, the second screen 214 is a composite of copper and stainless steel, which reduces an amount of nitrogen oxides in the exhaust flow. Further, the second screen 214 may be made of a material that will not react with the exhaust flow. Moreover, the second screen 214 does not necessarily need to comprise the same materials as the first screen 212. For example, the first screen 212 may be nickel, and the second screen may be a stainless steel and copper composite.

Electricity from the electrode 210 to the second screen 214 creates plasma from the exhaust gases that have passed through the substrate 216. Thus, more toxic gases are removed from the exhaust flow, which continues out of the shell 202 to the exhaust path 204 of the vehicle.

Therefore, there are several stages for toxic gas reduction in the device 200: reaction of the toxic gases with materials of the first screen 212; reaction with the electric arc from the electrode and the first screen 212; reaction with the substrate 216; reaction while forming plasma at the second screen 214; and reaction with materials of the second screen 214. Overall, the oxygen content of the exhaust is raised to about 14-15% of the exhaust, and the amounts of THC, carbon monoxide, carbon dioxide, and nitrogen oxide are greatly reduced.

Figure 3:
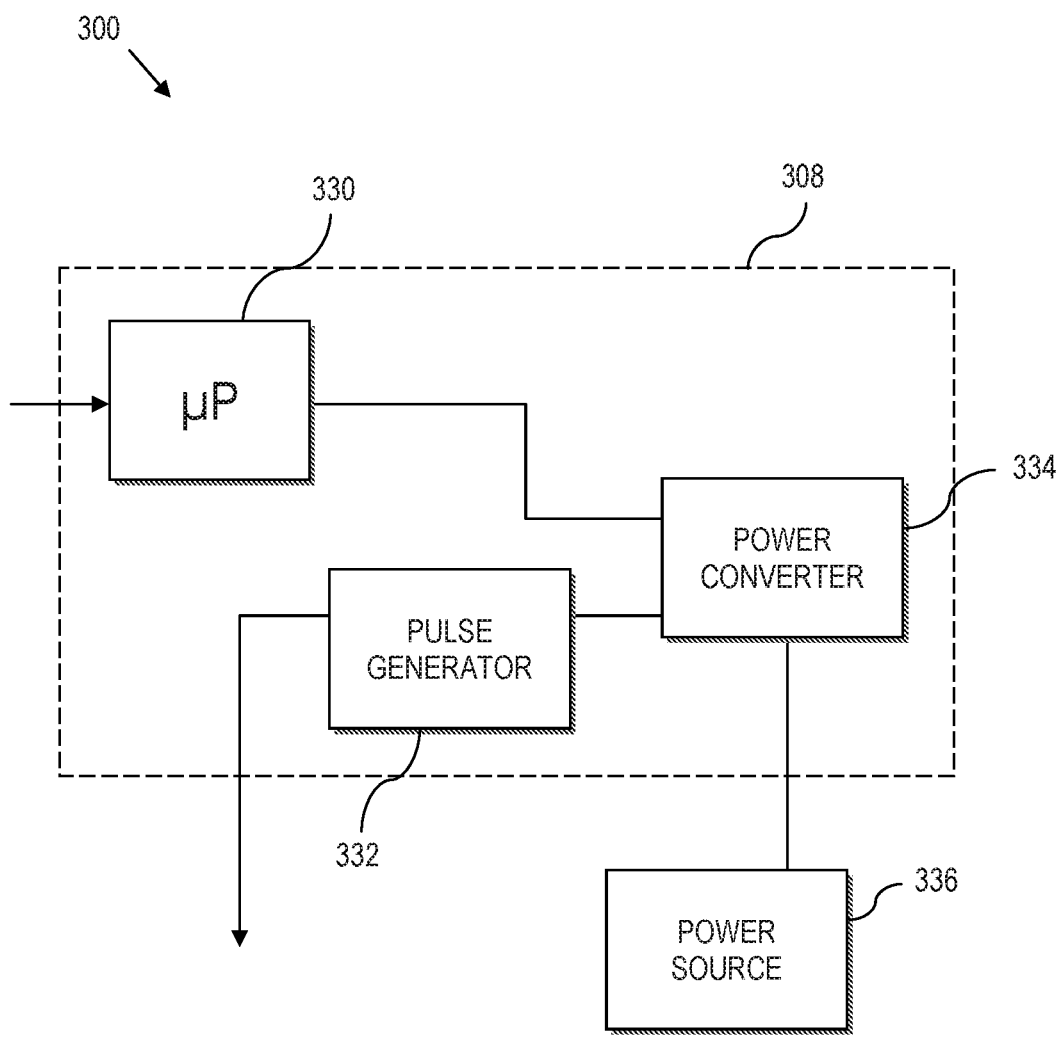
FIG. 3 is a block diagram of a power control system to supply a high-voltage pulse to an electrode of the apparatus for reducing toxic gases, according to various aspects of the present disclosure.

Turning now to FIG. 3, a power control system 308 for a device 300 for reducing toxic gases in an exhaust flow is shown. The power control system 308 may be used to create the high-voltage pulses for the electrode (210, FIG. 2) of the device. As such, the power control system 308 includes a microprocessor 330 that receives an indication of engine speed. For example, the microprocessor 330 may be coupled to a controller area network (CAN) bus of the vehicle, and when information about the engine speed is available on the CAN bus, the microprocessor 330 reads that information. As another example, the microprocessor 330 may receive the indication of engine speed from a tachometer, from a timing sequence for the firing of spark plugs, etc., or combinations thereof. Regardless of where the indication of engine speed comes from, the microprocessor 330 receives that indication for future use.

Using the indication of engine speed, the microprocessor 330 determines a desired pulse rate and voltage to pulse the electrode. For example, when the engine is at low revolutions per minute (or even no revolutions per minute), the pulse rate may be set to a minimum pulse rate. In some embodiments, the minimum pulse rate may be 1,500 pulses per minute; while in other embodiments, the minimum pulse rate may be 12,000 pulses per minute. On the other hand, when the engine is running at a high number of revolutions per minute, the pulse rate may be set to a maximum pulse rate. For example, the maximum pulse rate may be 15,000 pulses per minute. As such, in some embodiments, the processor 330 controls the pulse rate to a predetermined pulse rate that ranges between 1,500 pulses per minute and 15,000 pulses per minute depending on the indication of the engine speed. In numerous embodiments, the processor 330 controls the pulse rate to a predetermined pulse rate that ranges between 12,000 pulses per minute and 15,000 pulses per minute depending on the indication of the engine speed.

To control the pulse rate, the processor 330 communicates with a pulse generator 332 to generate the pulses. For example, if the pulse rate is determined to be 15,000 pulses per minute, then the pulse generator 332 may create a pulse every 4 milliseconds (ms). Thus, the width of the pulse must be less than 4 ms. To have a fifty percent duty cycle, the pulse width should be 2 ms. However, other duty cycles may be used. For example, a thinner pulse (i.e., a lower duty cycle) would require less power over time, and thus may be desirable. On the other hand, a wider pulse (i.e., a higher duty cycle) may expend more energy to have a more dramatic effect in reducing the toxic gases.

As shown, the pulse generator is separate from the microprocessor 330. However, in some embodiments, the pulse generator is part 332 of the microprocessor 330.

Further, the processor 330 controls a voltage of the high-voltage pulse based on the indication of engine speed. For example, when the engine is at low revolutions per minute (or even no revolutions per minute), the voltage may be set to a minimum voltage. In some embodiments, the minimum voltage may be 40 kV; while in other embodiments, the minimum pulse rate may be 120 kV. On the other hand, when the engine is running at a high number of revolutions per minute, the voltage may be set to a maximum voltage. For example, the maximum voltage may be 15000 kV. As such, in some embodiments, the processor 330 controls the voltage to a predetermined voltage that ranges between 40 kV and 150 kV depending on the indication of the engine speed. In numerous embodiments, the processor 330 controls the voltage to a voltage that ranges between 120 kV and 150 kV depending on the indication of the engine speed.

For example, the processor 330 communicates with a power converter 334 that converts voltage from a power source 336 to the voltage of the desired pulse. For example, a typical car battery (i.e., power source 336) supplies twelve volts, so the power converter 334 needs to amplify that voltage over ten-thousand times (in some instances) to produce the high voltage for the pulse. However, as discussed above, the pulse may have a relatively low duty cycle, so the drain on the battery may be very low. As another example, the power source may be an alternator of the vehicle, which typically supplies around fourteen volts. Thus, a similar power conversion may be required.

As shown, the power converter 336 is separate from the processor 330. However, in some embodiments, the power converter may be part of the processor 330. Further, the power source 336 is separate from the device 300. As such, the device 300 can run off of typical voltages supplied in a vehicle.

The high-voltage pulse generated by the power control system 308 is sent to the electrode that is disposed in the shell to create the electric arc and the plasma, as discussed above. This high-voltage pulse allows the device to start functioning properly as soon as it is activated, unlike other devices that require a warm-up period. Thus, the device may be placed anywhere in the exhaust path, as opposed to close to the manifold of the engine to heat up more quickly.

Figure 4:
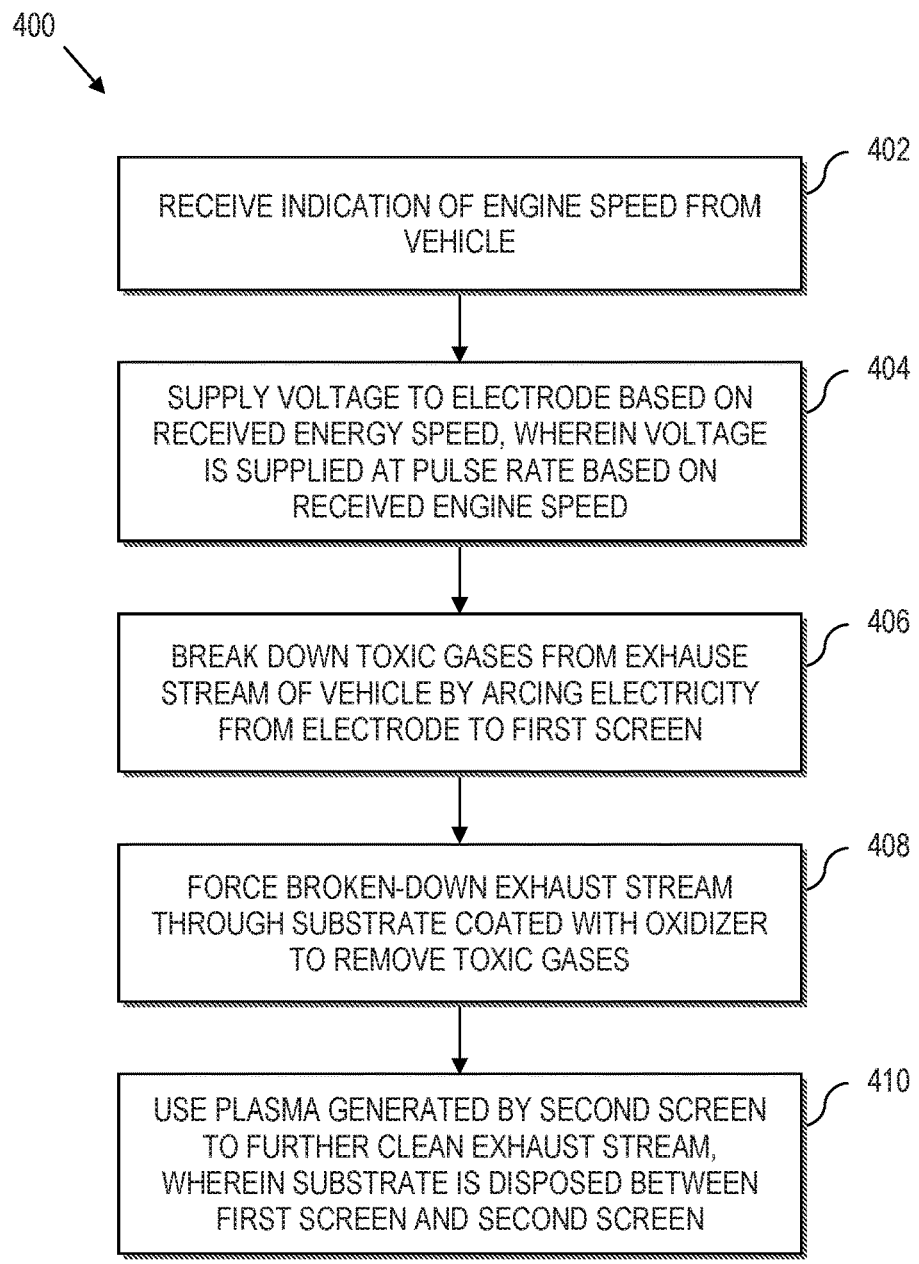
FIG. 4 is a flow chart illustrating a process for removing toxic gases from an exhaust stream, according to various aspects of the present disclosure.

Turning now to FIG. 4, a process 400 for removing toxic gases from an exhaust stream is shown. At 402, an indication of a speed of an engine of a vehicle is received. For example, an indication of the engine speed (e.g., revolutions per minute) may be available on a CAN bus of the vehicle. A processor may read the CAN bus to extract information relating to the engine speed. As another example, the engine speed may be determined by a firing rate of spark plugs of the engine. The processor may monitor the firing rate itself or a signal that controls the firing rate. Further, other methods may be used to receive an indication of the engine speed as desired.

At 404, a voltage is supplied to electrode based on the received speed of the engine of the vehicle. For example, at a low engine speed, a lower or minimum voltage may be supplied to the electrode. On the other hand, at a higher engine speed, a higher or maximum voltage may be supplied to the electrode. Further, the voltage is supplied as a pulse at a pulse rate based on the engine speed. For example, at a low engine speed, a lower or minimum pulse rate may be used to supply the voltage to the electrode. On the other hand, at a higher engine speed, a higher or maximum pulse rate may be used to supply the voltage to the electrode.

At 406, toxic gases in the exhaust stream are broken down by an electric current that arcs from the electrode to a first screen, as described above. For example, a voltage is pulsed on an electrode that creates an electric arc from the electrode to the first screen. Some of the gases in the exhaust stream are broken down to molecules that may be recombined to less toxic gases. Through experimentation, it has been found that a higher voltage breaks down more toxic gases.

At 408, the broken down exhaust stream is forced through a substrate coated with an oxidizer to remove toxic gases from the broken down exhaust stream. For example, the screen and substrate can be inside a shell that guides the exhaust stream to the substrate. Further, the shell may include a blanket as described above. As the broken down exhaust stream passes through the substrate, the substrate acts as a catalyst to recombine the broken down molecules into less toxic gases, as described above.

At 410, plasma generated by the second screen and the electrode further cleans the exhaust stream by eliminating some of the toxins and further redistributing molecules of toxic gases. Through testing, it has been found that the process 400 described herein reduces or eliminates toxic gases including THC, carbon monoxide, carbon dioxide, and nitrogen oxides while increasing oxygen levels.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable storage medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), Flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable storage medium does not include propagating signals.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium is any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Network using an Network Service Provider).

Aspects of the present disclosure are described herein with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the invention in the form disclosed. Many modifications and variations will be apparent to those of ordinary skill in the art without departing from the scope and spirit of the invention. Aspects of the disclosure were chosen and described in order to best explain the principles of the invention and the practical application, and to enable others of ordinary skill in the art to understand the invention for various embodiments with various modifications as are suited to the particular use contemplated.

What is claimed is:

1. An apparatus for reducing toxic gases from exhaust of a vehicle, the apparatus comprising:
   a shell disposed in line with an exhaust path of a vehicle;
   an electrode that passes through the shell;
   a power control system electrically coupled to the electrode, wherein the power control system is programmed to supply at least 120 kV to the electrode at a predefined pulse rate, wherein the power control system converts power from a battery of the vehicle to the at least 120 kV having a duty cycle of less than a fifty-percent duty cycle;
   a first screen disposed within the shell apart from the electrode, such that when the at least 120 kV is supplied to the electrode, an arc of electricity forms between the electrode and the first screen;
   a substrate coated with an oxidizer, wherein the substrate is disposed within the shell downstream from the first screen; and
   a second screen disposed within the shell downstream from the substrate such that the substrate is disposed between the first screen and the second screen.

2. The apparatus of claim 1, wherein the second screen comprises a different material than the first screen.

3. The apparatus of claim 1, wherein the second screen creates a plasma to reduce toxicity of gases near the second screen.

4. The apparatus of claim 1, wherein the arc of electricity breaks down toxic gases in the exhaust path present near the first screen.

5. The apparatus of claim 1 further comprising a blanket disposed between the substrate and the shell to create a seal between the substrate and the shell that compensates for thermal expansion and contraction of the shell to prevent exhaust gases from passing by the substrate without making contact with the substrate.

6. The apparatus of claim 1, wherein the predefined pulse rate is at least 12,000 pulses per minute.

7. The apparatus of claim 1, wherein the predefined pulse rate is based on an engine speed of the vehicle.

8. The apparatus of claim 7, wherein the predefined pulse rate ranges between 12,000 pulses per minute and 15,000 pulses per minute based on the engine speed of the vehicle.

9. The apparatus of claim 1, wherein the power control system is programmed to supply a voltage based on an engine speed of the vehicle.

10. The apparatus of claim 8, wherein the power control system is programmed to supply a voltage between 120 kV and 150 kV based on the engine speed of the vehicle.

11. An apparatus for reducing toxic gases from exhaust of a vehicle, the apparatus comprising:
    a shell disposed in line with an exhaust path of a vehicle;
    an electrode that passes through the shell;
    a power control system electrically coupled to the electrode, wherein the power control system is programmed to supply at least 40 kV to the electrode at a predefined pulse rate wherein the power control system converts power from a battery of the vehicle to the at least 40 kV having a duty cycle of less than a fifty-percent duty cycle;

a first screen disposed within the shell apart from the electrode, such that when the at least 40 kV is supplied to the electrode, an arc of electricity forms between the electrode and the first screen;

a substrate coated with an oxidizer, wherein the substrate is disposed within the shell downstream from the first screen; and a second screen disposed within the shell downstream from the substrate such that the substrate is disposed between the first screen and the second screen, wherein the second screen comprises a different material than the first screen.

12. The apparatus of claim 11, wherein the second screen creates a plasma to reduce toxicity of gases near the second screen.

13. The apparatus of claim 11, wherein the arc of electricity breaks down toxic gases in the exhaust path present near the first screen.

14. The apparatus of claim 11 further comprising a blanket disposed between the substrate and the shell to create a seal between the substrate and the shell that compensates for thermal expansion and contraction of the shell to prevent exhaust gases from passing by the substrate without making contact with the substrate.

15. The apparatus of claim 11, wherein the predefined pulse rate is at least 1,500 pulses per minute.

16. The apparatus of claim 11, wherein the predefined pulse rate is based on an engine speed of the vehicle.

17. The apparatus of claim 16, wherein the predefined pulse rate ranges between 1,500 pulses per minute and 15,000 pulses per minute based on the engine speed of the vehicle.

18. The apparatus of claim 11, wherein the power control system is programmed to supply a voltage based on an engine speed of the vehicle.

19. The apparatus of claim 18, wherein the power control system is programmed to supply a voltage between 40 kV and 150 kV based on the engine speed of the vehicle.

20. A process for removing toxic gases from an exhaust stream, the process comprising:

receiving an indication of a speed of an engine of a vehicle;

supplying a voltage to an electrode based on the received speed of the engine of the vehicle, wherein the voltage is supplied at a pulse rate based on the received speed of the engine of the vehicle, wherein the voltage is:

produced from a battery of the vehicle;

above 120 kV; and includes a less than fifty-percent duty cycle;

breaking down toxic gases from the exhaust stream of the vehicle by arcing electricity from the electrode to a first screen;

forcing the broken down exhaust stream through a substrate coated with an oxidizer to remove toxic gases from the broken down exhaust stream; and using plasma generated by a second screen to further clean the exhaust stream, wherein the substrate is disposed between the first screen and the second screen.

* * * * *